US008294960B2

(12) United States Patent  (10) Patent No.: US 8,294,960 B2
Fujishita  (45) Date of Patent: Oct. 23, 2012

(54) IMAGE PROCESSING DEVICE AND SYSTEM, AND COMPUTER READABLE MEDIUM THEREFOR

(75) Inventor: Masahiro Fujishita, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 290 days.

(21) Appl. No.: 12/711,772

(22) Filed: Feb. 24, 2010

(65) Prior Publication Data

US 2010/0225980 A1   Sep. 9, 2010

(30) Foreign Application Priority Data

Mar. 3, 2009   (JP) ................................. 2009-049275
Mar. 30, 2009  (JP) ................................. 2009-082934

(51) Int. Cl.
*H04N 1/04* (2006.01)
(52) U.S. Cl. ......... 358/488; 358/474; 358/475; 358/496
(58) Field of Classification Search .................. 358/488, 358/474, 475, 496, 497, 498
See application file for complete search history.

(56) References Cited

U.S. PATENT DOCUMENTS

| 4,807,287 | A * | 2/1989 | Tucker et al. ................ 713/179 |
| 5,745,664 | A * | 4/1998 | Nomura et al. ............. 358/1.18 |
| 7,840,092 | B2 | 11/2010 | Sato et al. |
| 8,169,652 | B2 | 5/2012 | Yoda |
| 8,184,343 | B2 | 5/2012 | Tani et al. |
| 2003/0068099 | A1 | 4/2003 | Chao et al. |
| 2003/0160977 | A1 | 8/2003 | Nishikawa et al. |
| 2003/0202193 | A1 | 10/2003 | Yokochi |
| 2007/0091373 | A1 | 4/2007 | Sato et al. |
| 2010/0214584 | A1 | 8/2010 | Takahashi |
| 2010/0220343 | A1 | 9/2010 | Horikawa |

FOREIGN PATENT DOCUMENTS

| JP | 5-81266 | 4/1993 |
| JP | 8-289132 | 11/1996 |
| JP | 2001-56857 | 2/2001 |
| JP | 2001-76127 | 3/2001 |

(Continued)

OTHER PUBLICATIONS

Decision to Grant a Patent dated Jan. 24, 2012 received from the Japanese Patent Office from related Japanese Application No. 2009-289047 and U.S. Appl. No. 12/894,714, together with a partial English-language translation.

(Continued)

*Primary Examiner* — Houshang Safaipour
(74) *Attorney, Agent, or Firm* — Scully, Scottt, Murphy & Presser, PC

(57) ABSTRACT

An image processing device determines whether a total number of ancillary images based on input data is equal to a total number of document images extracted from acquired image data. When determining that the total number of the ancillary images is different from the total number of the document images, the image processing device makes an adjustment such that the total number of the ancillary images is equal to the total number of the document images. Based on the document images and the ancillary images after the adjustment, the image processing device generates set data each piece of which has a set of a document image and an ancillary image based on ancillary data identified as being associated with the document image. The image processing device outputs the set data generated.

19 Claims, 13 Drawing Sheets

FOREIGN PATENT DOCUMENTS

| | | |
|---|---|---|
| JP | 2006-114971 | 4/2006 |
| JP | 2006-135819 | 5/2006 |
| JP | 2007-49518 | 2/2007 |
| JP | 2007-116469 | 5/2007 |
| JP | 2010-200070 | 9/2010 |

OTHER PUBLICATIONS

Notice of Allowance dated Aug. 23, 2012 from related U.S. Appl. No. 12/711,687.

* cited by examiner

IMAGE PROCESSING DEVICE AND SYSTEM, AND COMPUTER READABLE MEDIUM THEREFOR

CROSS-REFERENCE TO RELATED APPLICATION

This application claims priority under 35 U.S.C. §119 from Japanese Patent Applications No. 2009-049275 filed on Mar. 3, 2009 and No. 2009-082934 filed on Mar. 30, 2009. The entire subject matters of the applications are incorporated herein by reference.

BACKGROUND

1. Technical Field

The following description relates to one or more image processing techniques for processing and outputting images.

2. Related Art

An image processing device has been known which combines an image (an ancillary image) based on a character string input by a user with an image acquired by scanning a document.

SUMMARY

According to such an image processing device, when combining respective different character strings with a plurality of document sheets, a user has to read the document sheets on a sheet-by-sheet basis and input a corresponding character string as needed for each of the document sheets. Namely, the above technique requires the user to perform the troublesome operations for each of the document sheets. Further, the number of the document sheets is not necessarily identical to the number of the input character strings. Namely, the aforementioned image processing device may place, on the user, a serious burden to correct a mistakenly-input character string.

Aspects of the present invention are advantageous to provide one or more improved techniques that make it possible to output, in a user-friendly manner, each piece of image data based on two or more document sheets, in association with corresponding ancillary data.

According to aspects of the present invention, an image processing device is provided, which includes an image acquiring unit configured to acquire image data from one or more document sheets set thereon, an image extracting unit configured to extract, from the acquired image data, respective document images based on the document sheets, an image position specifying unit configured to specify a position of each of the extracted document images which position is defined on the acquired image data, a first identification provider configured to provide each of the document images with a first identification for identifying the document image, based on the specified positions of the document images, an input unit configured to input ancillary data each piece of which is for creating an ancillary image, a second identification provider configured to provide each piece of the input ancillary data with a second identification for identifying the piece of the ancillary data, an ancillary data identifying unit configured to identify a piece of the ancillary data as being associated with each of the document images, based on the first and second identifications, a set data generator configured to generate set data each piece of which has a set of a document image and an ancillary image based on ancillary data identified by the ancillary data identifying unit as being associated with the document image, a determining unit configured to determine whether a total number of the ancillary images based on the input data is equal to a total number of the document images extracted, an adjuster configured to, when the determining unit determines that the total number of the ancillary images is different from the total number of the document images, make an adjustment such that the total number of the ancillary images is equal to the total number of the document images, a data generation controller configured to take control of the set data generator to generate the set data based on the document images and the ancillary images after the adjustment by the adjuster, and an output unit configured to output the set data generated by the set data generator under the control by the data generation controller.

In some aspects of the present invention, even though the total number of the ancillary images is different from the total number of the document images, the image processing device configured as above can make an adjustment such that the total number of the ancillary images is equal to the total number of the document images. Therefore, the image processing device configured as above can reduce a user who attempts to make the total number of the ancillary images equal to the total number of the document images. Thus, the image processing device configured as above can offer a high level of user-friendliness in outputting the set data each piece of which has a set of a document image and an ancillary image.

According to aspects of the present invention, further provided is an image processing system which includes an image acquiring unit configured to acquire image data from one or more document sheets set thereon, an image extracting unit configured to extract, from the acquired image data, respective document images based on the document sheets, an image position specifying unit configured to specify a position of each of the extracted document images which position is defined on the acquired image data, a first identification provider configured to provide each of the document images with a first identification for identifying the document image, based on the specified positions of the document images, an input unit configured to input ancillary data each piece of which is for creating an ancillary image, a second identification provider configured to provide each piece of the input ancillary data with a second identification for identifying the piece of the ancillary data, an ancillary data identifying unit configured to identify a piece of the ancillary data as being associated with each of the document images, based on the first and second identifications, a set data generator configured to generate set data each piece of which has a set of a document image and an ancillary image based on ancillary data identified by the ancillary data identifying unit as being associated with the document image, a determining unit configured to determine whether a total number of the ancillary images based on the input data is equal to a total number of the document images extracted, an adjuster configured to, when the determining unit determines that the total number of the ancillary images is different from the total number of the document images, make an adjustment such that the total number of the ancillary images is equal to the total number of the document images, a data generation controller configured to take control of the set data generator to generate the set data based on the document images and the ancillary images after the adjustment by the adjuster, and an output unit configured to output the set data generated by the set data generator under the control by the data generation controller.

In some aspects of the present invention, the image processing system configured as above can provide the same effects as the aforementioned image processing device.

According to aspects of the present invention, further provided is a computer readable medium having computer readable instructions stored thereon. When executed by a processor, the instructions cause the processor to perform an image acquiring step of acquiring image data from one or more document sheets set on an image acquiring unit, an image extracting step of extracting, from the acquired image data, respective document images based on the document sheets, an image position specifying step of specifying a position of each of the extracted document images which position is defined on the acquired image data, a first identification providing step of providing each of the document images with a first identification for identifying the document image, based on the specified positions of the document images, an input step of inputting ancillary data each piece of which is for creating an ancillary image, a second identification providing step of providing each piece of the input ancillary data with a second identification for identifying the piece of the ancillary data, an ancillary data identifying step of identifying a piece of the ancillary data as being associated with each of the document images, based on the first and second identifications, a determining step of determining whether a total number of the ancillary images based on the input data is equal to a total number of the document images extracted, an adjusting step of, when it is determined in the determining step that the total number of the ancillary images is different from the total number of the document images, making an adjustment such that the total number of the ancillary images is equal to the total number of the document images, a set data generating step of, based on the document images and the ancillary images after the adjustment in the adjusting step, generating set data each piece of which has a set of a document image and an ancillary image based on ancillary data identified in the ancillary data identifying step as being associated with the document image, and an output step of outputting the set data generated in the set data generating step.

In some aspects of the present invention, the computer readable medium configured as above can provide the same effects as the aforementioned image processing device and system.

BRIEF DESCRIPTION OF THE ACCOMPANYING DRAWINGS

FIG. 1 schematically shows a configuration of a printing system according to one or more aspects of the present invention.

FIG. 2 is a flowchart showing a procedure of a main control program to be executed by a computer according to one or more aspects of the present invention.

FIG. 3 exemplifies a before-scanning preview screen according to one or more aspects of the present invention.

FIG. 4 is a flowchart showing a procedure of a data output program according to one or more aspects of the present invention.

FIG. 5 exemplifies a print preview screen according to one or more aspects of the present invention.

FIG. 6 is a flowchart showing a procedure of a correspondence set data program according to one or more aspects of the present invention.

FIG. 7 exemplifies a set data display screen according to one or more aspects of the present invention.

FIG. 8 is a flowchart showing a procedure of a before-rescanning preview program according to one or more aspects of the present invention.

FIG. 9 exemplifies a before-rescanning preview screen according to one or more aspects of the present invention.

Figure 13:
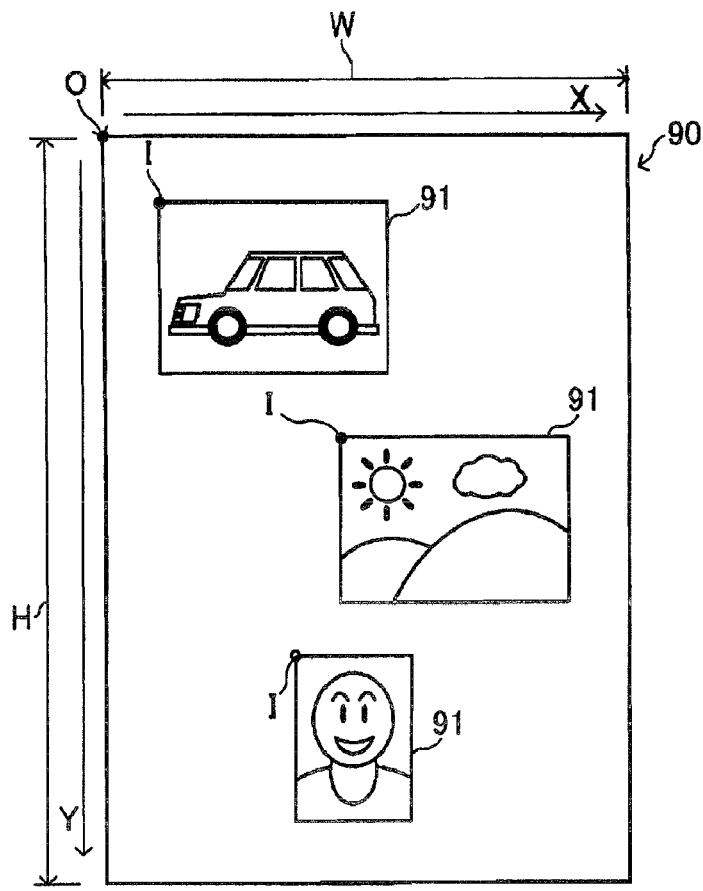

FIG. 13 exemplifies scanned data according to one or more aspects of the present invention.

Figure 14:
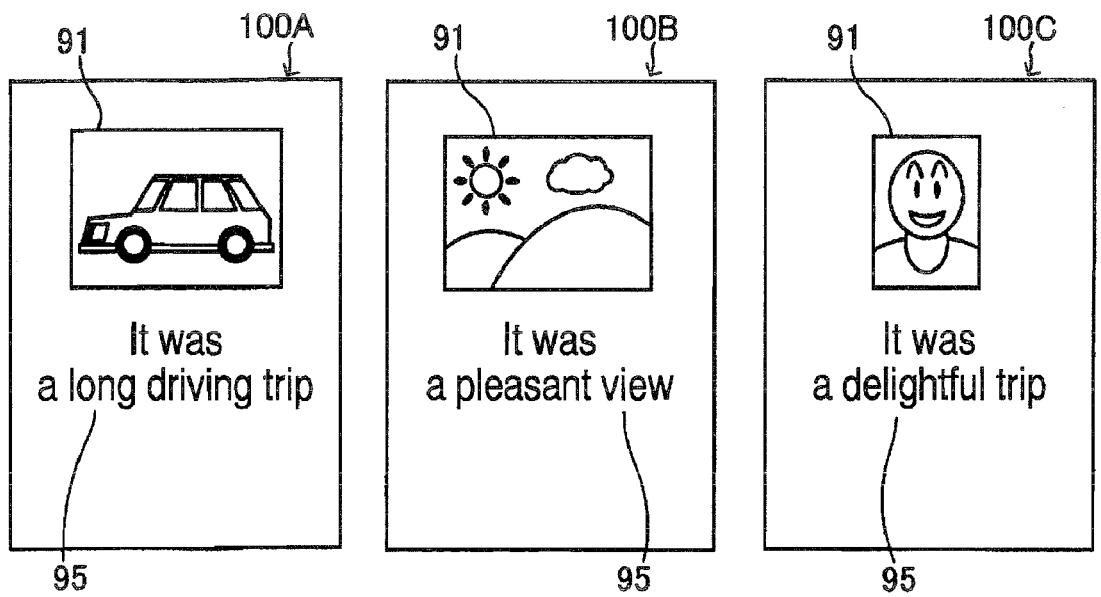

FIG. 14 exemplifies images output based on set data according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect.

Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, embodiments according to aspects of the present invention will be described with reference to the accompany drawings.

First Embodiment

Figure 1:
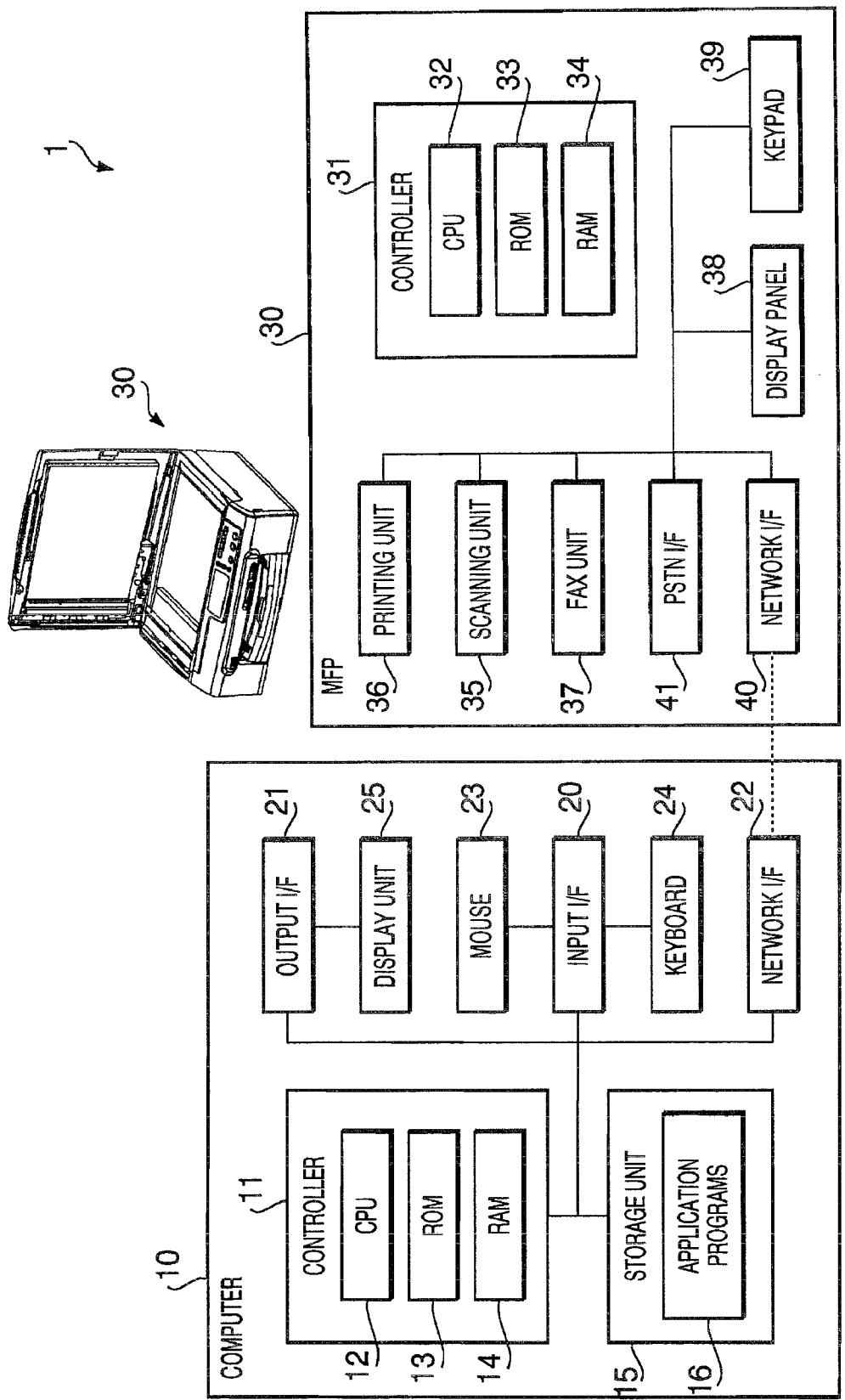

As illustrated in FIG. 1, a printing system 1 of a first embodiment is configured with a computer 10 and a multi-function peripheral (MFP) 30. The computer 10 is connected with the MFP 30 so as to exchange data (e.g., scanned data 90) therebetween.

Initially, a detailed explanation will be provided about a configuration of the computer 10 with reference to FIG. 1. As shown in FIG. 1, the computer 10 includes a controller 11.

The controller 11 is configured with a CPU 12, a ROM 13, and a RAM 14. The CPU 12 is a central processing unit configured to take overall control of the computer 10. The ROM 13 stores data and control programs required for controlling the computer 10. The RAM 14 is configured to temporarily store results of arithmetic operations performed by the CPU 12 using the control programs.

The computer 10 is provided with a storage unit (e.g., an HDD) 15. The storage unit 15 is connected with the controller 11. The storage unit 15 stores application programs 16. The application programs 16 contain a below-mentioned main control program (see FIG. 2), a document creating program, and a spread sheet program.

Further, the computer 10 has a mouse 23, a keyboard 24, and a display unit 25. The mouse 23 and the keyboard 24 are linked with the controller 11. The display unit 25 is connected with the controller 11 via an output I/F 21.

In addition, the computer 10 is provided with a network I/F 22. The computer 10 is connected with the MFP 30 via the network I/F 22.

Subsequently, a detailed explanation will be provided about a configuration of the MFP 30 with reference to FIG. 1. The MFP 30 has a controller 31. The controller 31 is configured with a CPU 32, a ROM 33, and a RAM 34. The CPU 32 is a central processing unit configured to take overall control of the MFP 30. The ROM 33 stores data and programs (e.g., see FIGS. 10-12) required for controlling the MFP 30. The RAM 34 is configured to temporarily store results of arithmetic operations performed by the CPU 32 using the programs.

The MFP 30 is provided with a scanning unit 35, a printing unit 36, and a facsimile unit 37. As can be understood from an external view of the MFP 30 shown in FIG. 1, the scanning unit 35 has a flatbed and a carriage.

The flatbed is configured with optically-transparent material (e.g., glass). The flatbed has such a size that an A3-sized sheet can be placed thereon. Thus, the user can place a plurality of document sheets simultaneously on the flatbed.

The carriage has a light source configured to emit light to a document sheet placed on the flatbed. The light, emitted by the light source of the carriage, is reflected by the document sheet on the flatbed, and used for taking an image with an imaging device. The imaging device has a plurality of image pickup elements (e.g., CCDs), and constitutes the scanning unit 35.

Accordingly, when a plurality of document sheets are placed on the flatbed, the MFP 30 controls the scanning unit 35 to acquire scanned data 90 as shown in FIG. 13. The scanned data 90 contains a plurality of document images 91 based on the document sheets on the flatbed.

The printing unit 36 is configured to print, on a sheet, an image based on input print data under control by the controller 31. Since a detailed configuration of the printing unit 36 has been known, an explanation about the printing unit 36 will be omitted. It is noted that as a printing method of the printing unit 36, various methods may be applied such as an electrophotographic method and an inkjet method.

The facsimile unit 37 is configured to perform facsimile transmission to a predetermined destination device under control by the controller 31. Namely, the facsimile unit 37 is configured to transmit facsimile transmission data as input, to the destination device via a public switched telephone line network. Since a detailed configuration of the facsimile unit 37 has been known, an explanation about the facsimile unit 37 will be omitted.

The MFP 30 is provided with a display panel 38 and a keypad 39. The display panel 38 is configured to display various kinds of information under control by the controller 31. The keypad 39 is used for various operations by the user. Further, the MFP 30 includes a network I/F 40, and a PSTN I/F 41.

Next, a main control program of the computer 10 included in the printing system 1 will be set forth with reference to FIG. 2 and other relevant drawings. The main control program is executed by the controller 11 of the computer 10.

At this time, a text input screen is displayed on the display unit 25 of the computer 10. The text input screen is the same as a below-mentioned before-scanning preview screen 50, except for not including a document position guide image 51 (which the before-scanning preview screen 50 includes).

Initially, the controller 11 determines whether there is a text (i.e., a character string) input in any of a first text entry field 54A, a second text entry field 54B, and a third text entry field 54C (see FIG. 3) (S1). The text may be input via the mouse 23 or the keyboard 24. When determining that there is a text input in any of the first to third text entry fields 54A to 54C (S1: Yes), the controller 11 goes to S2. Meanwhile, when determining that there is not a text input in any of the first to third text entry fields 54A to 54C (51: No), the controller 11 goes to S7.

In S2, the controller 11 displays a before-scanning preview screen 50 on the display unit 25 (S2). Here, a detailed explanation will be provided about the before-scanning preview screen 50 with reference to FIG. 3.

The before-scanning preview screen 50 includes a document position guide image 51, the first to third text entry fields 54A to 54C, and a "Print" button 55.

The document position guide image 51 is configured with one or more document position images 52 and input text images 53. The document position guide image 51 shows a correspondence relationship and a positional relationship between set positions on the scanning unit 35 where document sheets are placed and texts input in the first to third text entry fields 54A to 54C, in collaboration with a schematic illustration of the MFP 30 included on the before-scanning preview screen 50.

The document position images 52 indicate set positions on the flatbed where document sheets are to be set when document images 91 are acquired from the document sheets with the scanning unit 35. The input text images 53 indicate correspondence relationships and positional relationships between the document images 91 to be acquired later and the texts input in at least one of the first to third text entry fields 54A to 54C. It is noted that information displayed in the document position guide image 51 is updated in a below-mentioned step S4 in response to data in any of the first to third text entry fields 54A to 54C being updated.

The first to third text entry fields 54A to 54C are entry fields in which user-desired texts (character strings) are to be input. The first to third text entry fields 54A to 54C are associated with respective identification numbers. Text data input in each of the first to third text entry field 54A to 54C is associated with the identification number corresponding to the text entry field.

Figure 3:
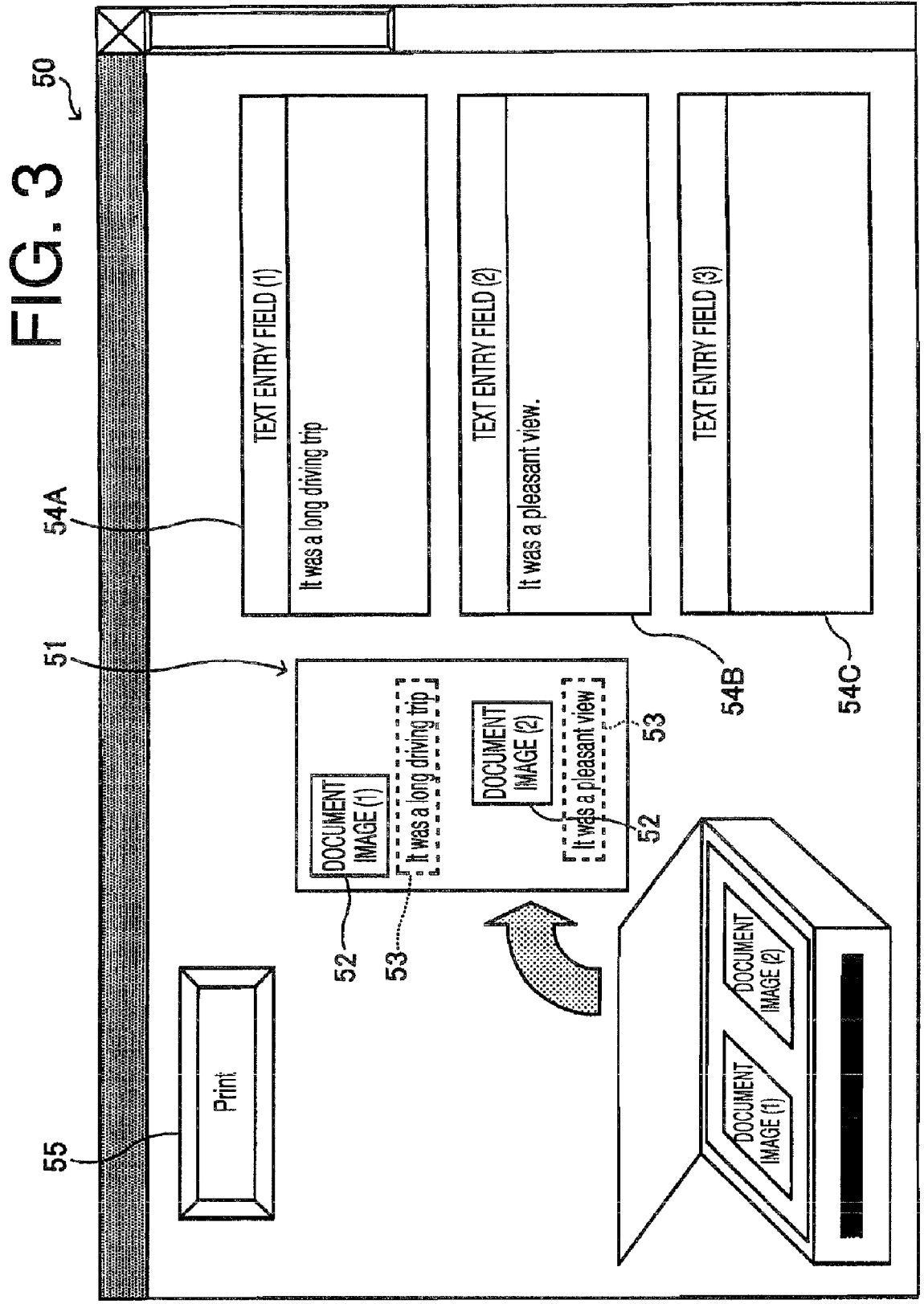

It is noted that although only three text entry fields, i.e., the first to third text entry fields 54A to 54C are shown in FIG. 3, more text entry fields may be included on the before-scanning preview screen 50.

The "Print" button 55 is operated when the user completely inputs all of the texts to be input and thereafter issues an instruction to print out composite data in which the input texts are combined with the document images 91 acquired by the scanning unit 35.

Referring back to FIG. 2, after displaying the before-scanning preview screen 50 on the display unit 25, the controller 11 sets a value of a counter n to "1" (S3). A text associated with an identification number identical to the value of the counter n is to be processed in S4.

In S4, based on a text input in a target text entry field, the controller 11 generates an input text image 53 and displays the input text image 53 in a predetermined position in the document position guide image 51 (see FIG. 3) (S4).

Subsequently, the controller 11 increments the value of the counter n by one (S5). Thereby, another text becomes an object to be processed.

Next, the controller 11 determines whether the value of the counter n is more than a total number of texts N (S6). The total number of texts N represents a total number of texts input in the text entry fields. When determining that the value of the counter n is more than the total number of texts N (S6: Yes), the controller 11 goes back to S1. Meanwhile, when determining that the value of the counter n is not more than the total number of texts N (S6: No), the controller 11 goes back to S4.

In S7, the controller 11 determines whether the "Print" button 55 has been operated (S7). When determining that the "Print" button 55 has been operated (S7: Yes), the controller 11 goes to S8. Meanwhile, when determining that the "Print" button 55 has not been operated (S7: No), the controller 11 goes to S1.

In S8, the controller 11 issues a copy command to the MFP 30 via the network I/F 22 (S8). The copy command contains the text data input in each of the text entry fields. In addition, each piece of the text data includes the identification number associated with a corresponding one of the text entry fields.

In S9, the controller 11 determines whether preview data has been received from the MFP 30 (S9). The preview data contains the scanned data 90 generated by the MFP 30 and set data each piece of which has a document image 91 and an ancillary text image 95 as a set. When determining that preview data has been received from the MFP 30 (S9: Yes), the controller 11 goes to S10. Meanwhile, when determining that preview data has not been received from the MFP 30 (S9: No), the controller 11 waits for the preview data to be received from the MFP 30.

In S10, the controller 11 runs a data output program to perform a data output process (S10).

Here, the data output program will be described in detail with reference to FIG. 4. In the data output process (S10), the controller 11 initially determines whether the number of ancillary texts N is equal to the number of document images M (S11). The number of document images M denotes a total number of the document images 91 contained in the preview data. When determining that the number of ancillary texts N is equal to the number of document images M (S11: Yes), the controller 11 goes to S12. Meanwhile, when determining that the number of ancillary texts N is not equal to the number of document images M (S11: No), the controller 11 goes to S17.

In S12, the controller 11 displays, on the display unit 25, a print preview screen 60 based on the preview data (S12).

Figure 5:
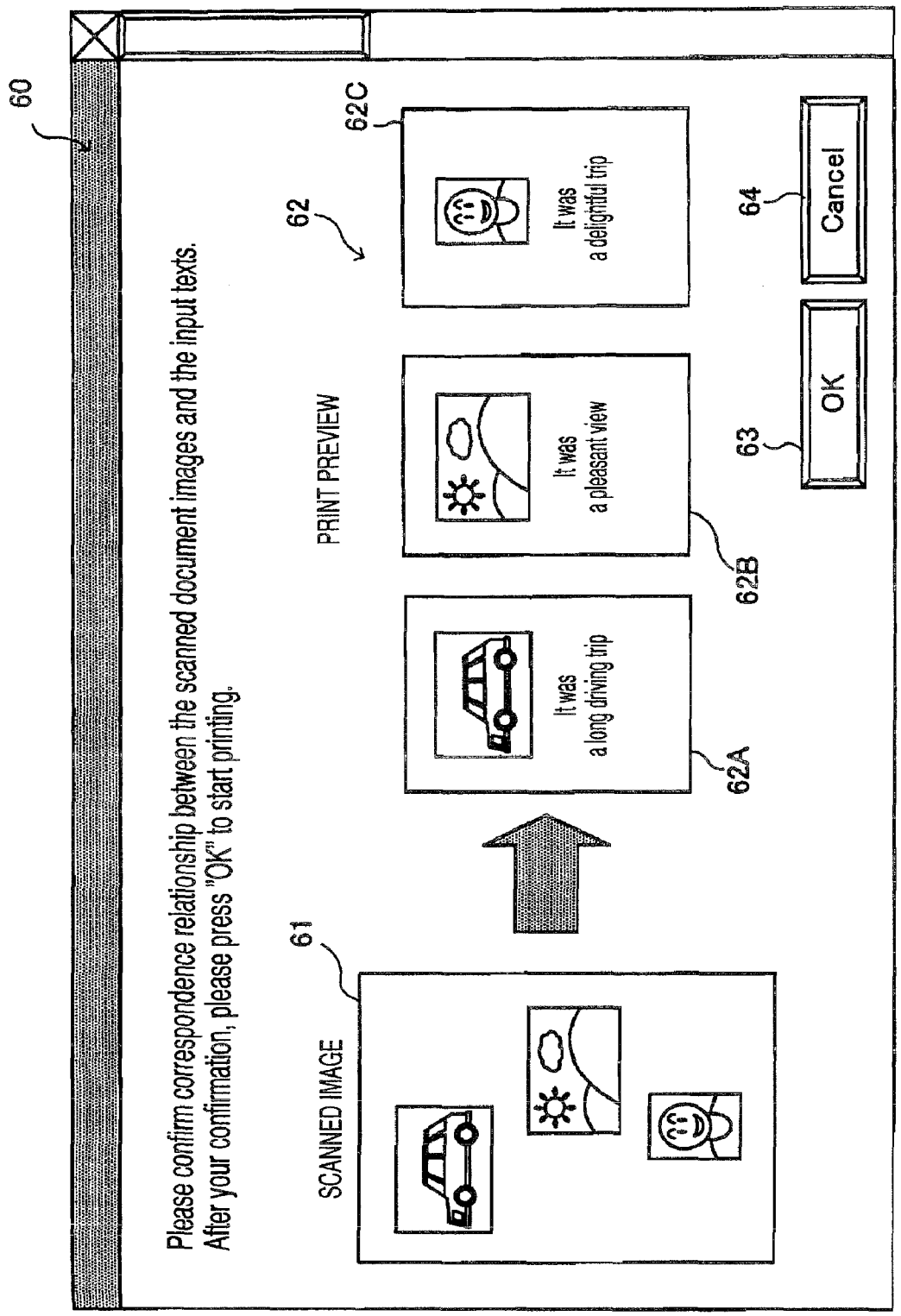

The print preview screen 60 will be described in detail with reference to FIG. 5. As illustrated in FIG. 5, the print preview screen 60 includes a scanned image 61, preview images 62, an "OK" button 63, and a "Cancel" button 64.

The scanned image 50 is based on the scanned data acquired by the scanning unit 35 of the MFP 30. The scanned image 61 shows images of document sheets set on the flatbed of the scanning unit 35.

The preview images 62 are based on the set data contained in the preview data. As will be described later, the set data is image data on each piece of which a document image 91 and an ancillary text image 95 are combined as a set so as to be allocated in respective predetermined position. In the example shown in FIG. 5, the preview images 62 include a first preview image 62A, a second preview image 62B, and a third preview image 62C, each of which is based on a single piece of the set data.

The "OK" button 63 is used for performing a printing operation on sheets as shown in the preview images 62 (i.e., in accordance with the set data). The "Cancel" button 64 is used for canceling the printing operation in accordance with the set data.

Again referring to FIG. 4, in S13, the controller 11 determines whether the "OK" button 63 has been operated (S13). When determining that the "OK" button 63 has been operated (S13: Yes), the controller 11 goes to S14. Meanwhile, when determining that the "OK" button 63 has not been operated (S13: No), the controller 11 goes to S15.

In S14, the controller 11 transmits, to the MFP 30 via the network I/F 22, a print command to instruct the MFP 30 to execute the printing operation based on the set data (S14). Then, the controller 11 terminates the main control program.

In S15, the controller 11 determines whether the "Cancel" button 64 has been operated (S15). When determining that the "Cancel" button 64 has been operated (515: Yes), the controller 11 advances to S16. Meanwhile, when determining that the "Cancel" button 64 has not been operated (S15: No), the controller 11 goes back to S13.

In S16, the controller 11 transmits, to the MFP 30 via the network I/F 22, a cancel command for canceling the printing operation based on the set data.

When the number of ancillary texts N is not equal to the number of document images M (S11: No), the controller 11 runs a correspondence set data program to perform a correspondence set data process (S17).

The correspondence set data program will be explained in detail with reference to FIG. 6. In the correspondence set data process (S17), the controller 11 displays a set data display screen 70 on the display unit 25 (S21).

Figure 7:
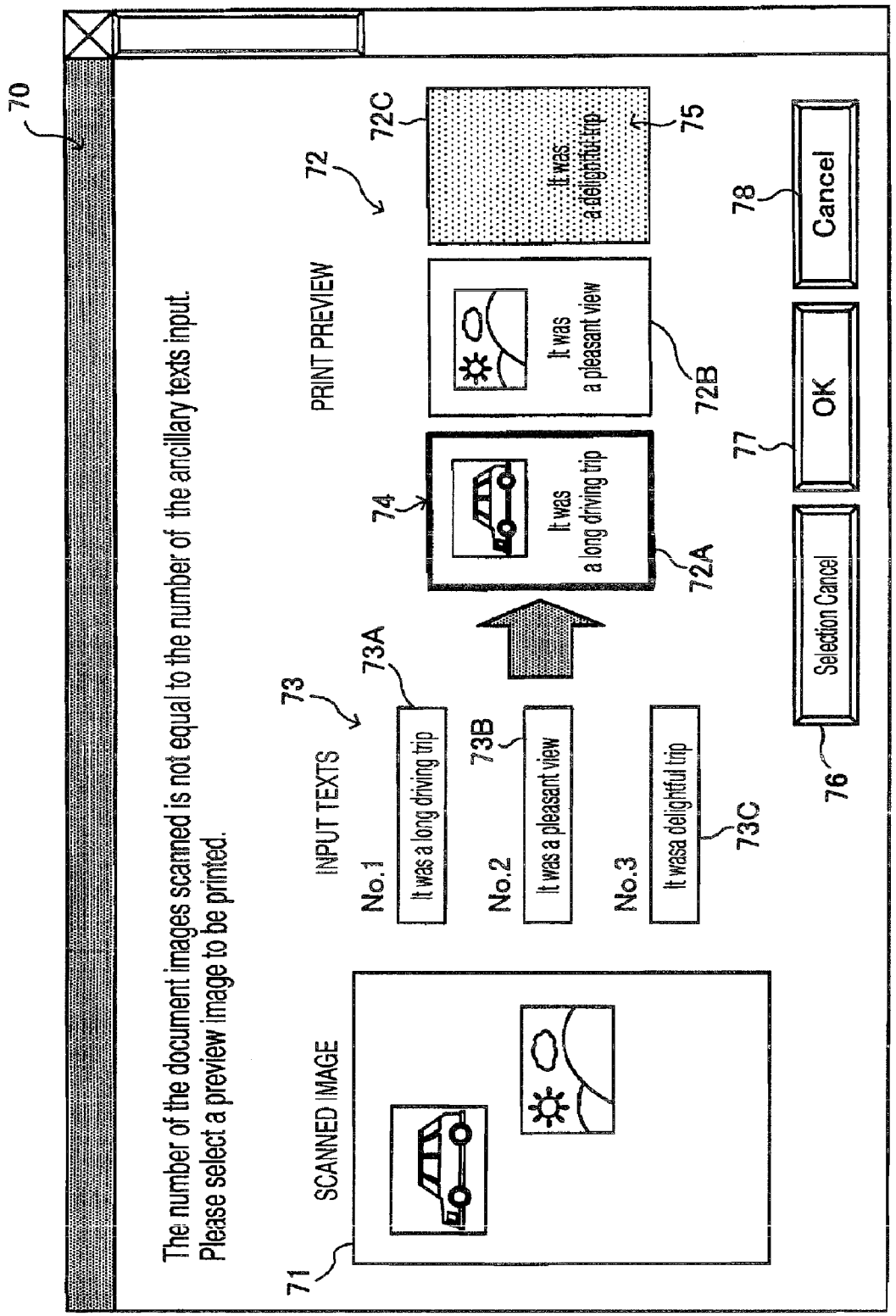

Referring to FIG. 7, a detailed explanation will be provided about the set data display screen 70 displayed in S21. As illustrated in FIG. 7, the set data display screen 70 includes a scanned image 71, preview images 72, and input text images 73.

The scanned image 71 shows images based on the scanned data 90 acquired by the scanning unit 35 of the MFP 30 in the same manner as the print preview screen 60. The input text images 73 show ancillary texts input in the text entry fields on the before-scanning preview screen 50, respectively. In the example shown in FIG. 7, a first text image 73A, a second text image 73B, and a third text image 73C denote the ancillary texts input in the first to third entry fields 54A to 54C, respectively.

The preview images 72 are based on the set data contained in the preview data. As described above, the set data display screen 70 is displayed on the display unit 25 when the number of ancillary texts N is not equal to the number of document images M. Therefore, the set data display screen 70 includes a preview image 72 that lacks any one of an ancillary text and a document image (i.e., a third preview image 72C in FIG. 7).

Further, the preview images 72 serve as options one of which is selected as a target image to be printed based on a corresponding piece of the set data. A print setting display 74 is displayed to be added to a preview image 72 selected by the user. The print setting display 74 represents that the set data corresponding to the user-selected preview image 72 is set as target data to be printed. A setting-impossible display 75 is displayed to be added to a preview image 72 (e.g., the third preview image 72C) that lacks any of an ancillary text and a document image. The setting-impossible display 75 represents that it is impossible to set, as target data to be printed, the set data corresponding to the preview image 72 which lacks one of an ancillary text and a document image 72.

The set data display screen 70 includes a selection cancel button 76, an "OK" button 77, and a "Cancel" button 78. The selection cancel button 76 is operated to cancel and initialize the setting of the target data to be printed that is made by selecting one of the preview images 72. The "OK" button 77 is operated to perform a printing operation based on set data determined as the target data to be printed. The "Cancel" button 78 is operated to cancel the printing operation based on the set data.

Again referring to FIG. 6, an explanation will be provided about operations in S22 and the following steps. In S22, the controller 11 performs a user operation accepting process (S22). Specifically, in the user operation accepting process (S22), the controller 11 accepts a user operation to set the target data to be printed by selecting one of the preview images 72, an operation of the selection cancel button 76, an operation of the "OK" button 77, or an operation of the "Cancel" button 78.

In S23, the controller 11 determines whether the "OK" button 77 has been operated (S23). When determining that the "OK" button 77 has been operated (S23: Yes), the controller 11 goes to S24. Meanwhile, when determining that the "OK" button 77 has not been operated (S23: No), the controller 11 goes to S25.

In S24, the controller 11 sets the values of a counter i and a counter k to "1," respectively (S24). The value of the counter i represents an identification number of set data to be processed in a below-mentioned step S26 and the steps thereafter (hereinafter, referred to as target set data). It is noted that an identification number of set data is identical to an identification number assigned to a document image and an ancillary text included in the set data. The value of the counter k, which is associated with a reset text in a below-mentioned step (S30), represents a turn in which the corresponding reset text is processed in a below-mentioned before-rescanning preview process (S18).

In S25, the controller 11 determines whether the "Cancel" button 78 has been operated (S25). When determining that the "Cancel" button 78 has been operated (S25: Yes), the controller 11 stores a cancel flag onto the RAM 14, and then terminates the correspondence set data program. Meanwhile, when determining that the "Cancel" button 78 has not been operated (S25: No), the controller 11 goes back to S22, in which the controller 11 accepts a user operation.

In S26, the controller 11 identifies target set data based on the value of the counter i, and determines whether the target set data is set as data to be printed (S26). When determining that the target set data is set as data to be printed (S26: Yes), the controller 11 goes to S27. Meanwhile, when determining that the target set data is not set as data to be printed (S26: No), the controller 11 goes to S28.

In S27, the controller 11 transmits a print command that instructs to perform printing based on the target set data, to the MFP 30 via the network IX 22 (S27).

In S28, the controller 11 determines whether the target set data includes an ancillary text (S28). In this case, the target set data is not set as data to be printed. When determining that the target set data includes an ancillary text (S28: Yes), the controller 11 goes to S29. Meanwhile, when determining that the target set data does not include an ancillary text (S28: No), the controller 11 terminates the correspondence set data program, and then goes to S18 (see FIG. 4).

In S29, the controller 11 sets the ancillary text (target ancillary text) included in the target set data as a text to be processed in the before-rescanning preview process that is executed in S18 (S29). In other words, in S29, the controller 11 stores, onto the RAM 14, the target ancillary text as a text to be reconfigured. It is noted that the ancillary text stored as a text to be reconfigured will be referred to as a "reconfigured text."

In S30, the controller 11 stores, onto the RAM 14, the current value of the counter k as an identification number of the reconfigured text, and then increments the value of the counter k by one (S30).

In S31, the controller 11 increments the value of the counter i by one and changes the target set data (S31).

In S32, the controller 11 determines whether the value of the counter i is more than the number of pieces of perfect set data T (S32). It is noted that the number of pieces of perfect set data T represents a total number of pieces of set data each of which contains a document image and an ancillary text. When determining that the value of the counter i is more than the number of pieces of perfect set data T (S32: Yes), the controller 11 goes to S33. Meanwhile, when determining that the value of the counter i is not more than the number of pieces of perfect set data T (S32: No), the controller 11 goes back to S26 to execute the steps S26 to S32 for the new set data.

In S33, the controller 11 determines whether the target set data includes an ancillary text (S33). In this case, the target set data lacks any one of a document image and an ancillary text. When determining that the target set data includes an ancillary text (S33: Yes), the controller 11 goes to S34. Meanwhile, when determining that the target set data does not include an ancillary text (S33: No), the controller 11 terminates the correspondence set data program, and then goes to S18 (see FIG. 4).

In S34, the controller 11 sets the ancillary text (target ancillary text) included in the target set data as a text to be processed in the before-rescanning preview process that is executed in S18 (S34). Namely, in S34, the controller 11 stores, onto the RAM 14, the target ancillary text as a reconfigured text.

In S35, the controller 11 stores, onto the RAM 14, the current value of the counter k as an identification number of the reconfigured text, and then increments the value of the counter k by one (S35).

In S36, the controller 11 increments the value of the counter i by one and changes the target set data (S36). Thereafter, the controller 11 goes back to S33 to execute the steps S33 to S36 for the new set data.

Figure 4:
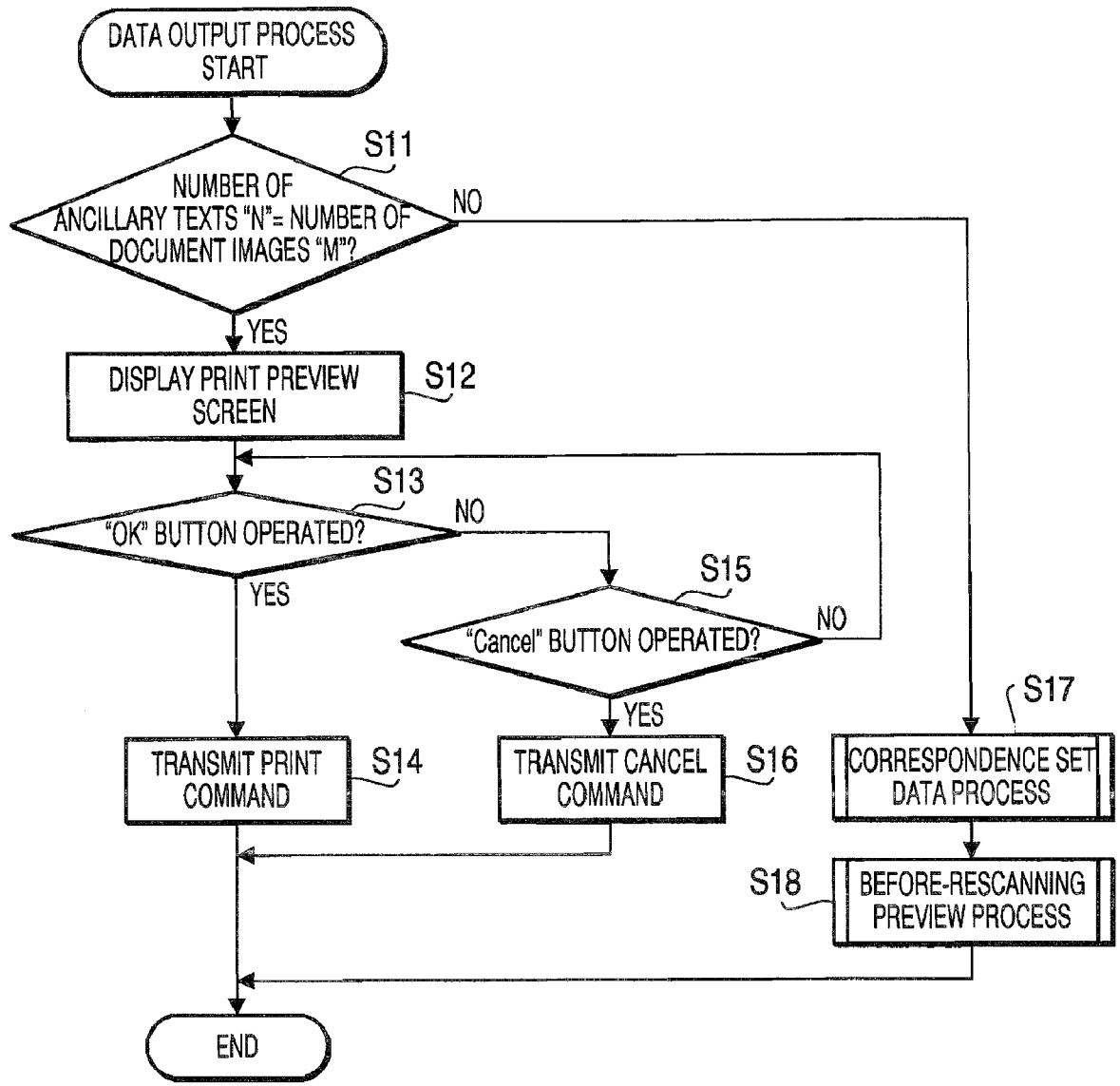

As illustrated in FIG. 4, after completing the correspondence set data process (S17), the controller 11 runs a before-rescanning preview program to perform the before-rescanning preview process (S18).

Figure 8:
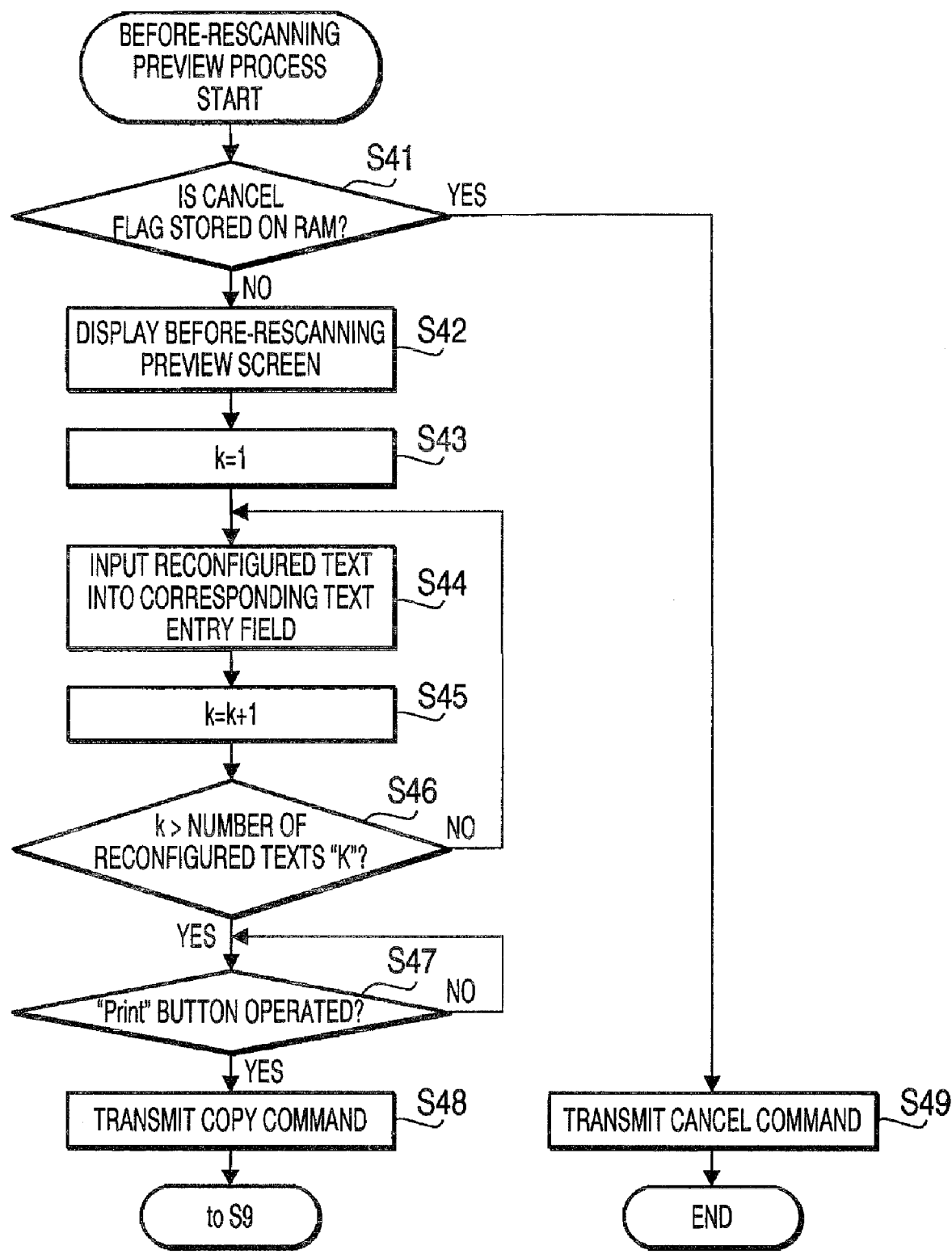

A detailed explanation will be provided about the before-rescanning preview program with reference to FIG. 8. In the before-rescanning preview process (S18), the controller 11 determines whether the cancel flag is stored on the RAM 14 (S41). When determining that the cancel flag is stored on the RAM 14 (S41: Yes), the controller 11 goes to S49. Meanwhile, when determining that the cancel flag is not stored on the RAM 14 (S41: No), the controller 11 goes to S42.

In S42, the controller 11 displays a before-rescanning preview screen 80 on the display unit 25. The before-rescanning preview screen 80 will be explained in detail with reference to FIG. 9.

Figure 9:
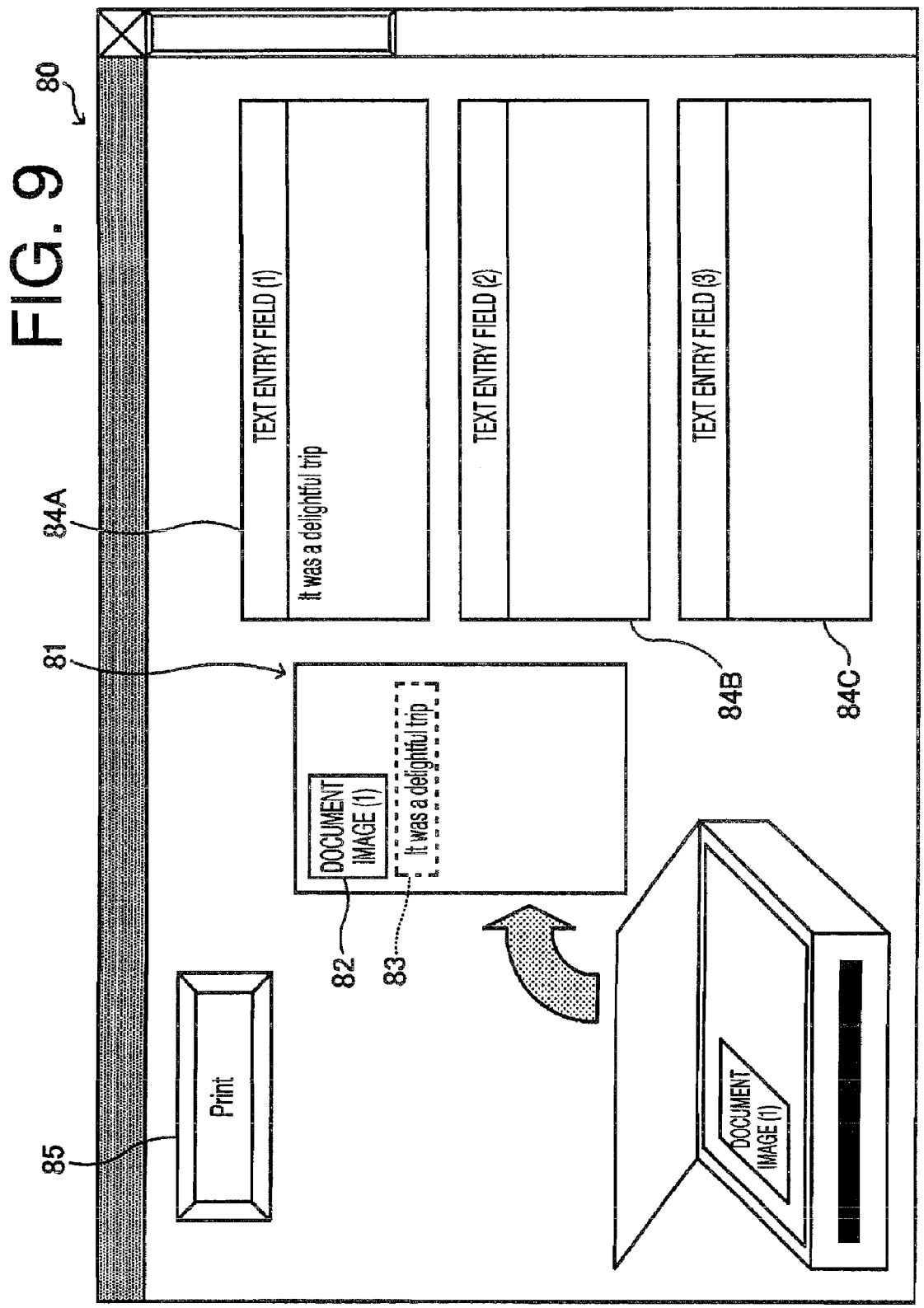

As shown in FIG. 9, the before-rescanning preview screen 80 is displayed in the same fashion as the before-scanning preview screen 50 (see FIG. 3). The before-rescanning preview screen 80 includes a reset position guide image 81, a first text entry field 84A, a second text entry field 84B, a third text entry field 84C, and a "Print" button 85.

The reset position guide image 81 includes one or more reset document position images 82 and one or more reconfigured text images 83. The reset position guide image 81 shows a correspondence relationship and a positional relationship between a reset position of a document sheet on the scanning unit 35 and a reconfigured text or a text additionally input into a text entry field 84A, 84B, or 84C, in collaboration with a schematic drawing of the MFP 30 shown on the before-rescanning preview screen 80.

The reset document position image 82 shows a set position of a document sheet on the flatbed before a document image 91 of the document sheet is reacquired with the scanning unit 35. The reconfigured text image 83 shows a correspondence relationship and a positional relationship between a text input into a text entry field 84A, 84B, or 84C and the later-reacquired document image 91.

As will be described later, a reconfigured text is automatically input into a text entry field 84A, 84B, or 84C based on an identification number associated with the reconfigured text. The reset position guide image 81 is updated in a below-mentioned step S44 in response to data in any of the text entry fields 84A to 84C being updated.

The first to third text fields 84A to 84C are entry fields into each of which a user-desired text (character string) can be input. Each of the text entry fields 84A to 84C is associated with an identification number. Further, text data input into a text entry field 84A, 84B, or 84C is associated with an identification number corresponding to the text entry field. Meanwhile, a reconfigured text is automatically input into a text entry field 84A, 84B, or 84C associated with an identification number corresponding to the reconfigured text.

It is noted that although there are only three entry fields (i.e., the first to third entry fields 84A to 84C) shown in FIG. 9, the before-rescanning preview screen 80 may include further more text entry fields.

The "Print" button 85 is operated when the user finishes inputting one or more texts and issues an instruction to print out images each of which has a set of a text input and a corresponding one of the document images 91 acquired by the scanning unit 35.

Again referring back to FIG. 8, in S43, the controller 11 sets the value of the counter k to "1" (S43). In this case, the value of the counter k denotes a text to be processed in the steps S44 to S46.

In S44, the controller 11 reads out a reconfigured text corresponding to the value of the counter k from the RAM 14, and inputs the reconfigured text into a text entry field corresponding to an identification number of the reconfigured text (S44) (e.g., see the first text entry field 84A in FIG. 9).

In S45, the controller 11 increments the value of the counter k by one and sets a new text as a text to be processed (S45).

In S46, the controller 11 determines whether the value of the counter k is more than the number of reconfigured texts K (S46). It is noted that the number of reconfigured texts K represents a total number of reconfigured texts stored on the RAM 14. Namely, in S46, the controller 11 determines whether each of the reconfigured texts is automatically set in a text entry field 84A to 84C. When determining that the value of the counter k is more than the number of reconfigured texts K (S46: Yes), the controller 11 goes to S47. Meanwhile, when determining that the value of the counter k is not more than the number of reconfigured texts K (S46: No), the controller 11 goes back to S44 to execute the steps S44 to S46 for the new text.

In S47, the controller 11 determines whether the "Print" button 85 has been operated (S47). When determining that the "Print" button 85 has been operated (S47: Yes), the controller 11 goes to S48. Meanwhile, when determining that the "Print" button 85 has not been operated (S47: No), the controller 11 waits for the "Print" button 85 to be operated.

In S48, the controller 11 transmits a copy command to the MFP 30 via the network I/F 22. After that, the controller 11 terminates the before-rescanning preview program, and goes to S9 in the main control program (see FIG. 2). In this case, the copy command includes the text data input in the text entry fields 84A to 84C on the before-scanning preview screen 80. In addition, the text data contains the identification numbers respectively associated with the text entry fields 84A to 84C.

When the cancel flag is stored on the RAM 14 (S41: Yes), the controller 11 goes to S49, in which the controller 11 transmits a cancel command for canceling a printing operation based on the set data to the MFP 30 via the network I/F 22. Thereafter, the controller 11 terminates the before-rescanning preview program.

As illustrated in FIG. 4, after terminating the before-rescanning preview process (S18), the controller 11 terminates the data output program. In response to the termination of the data output process (S10), the controller 11 terminates the main control program (see FIG. 2).

Figure 10:
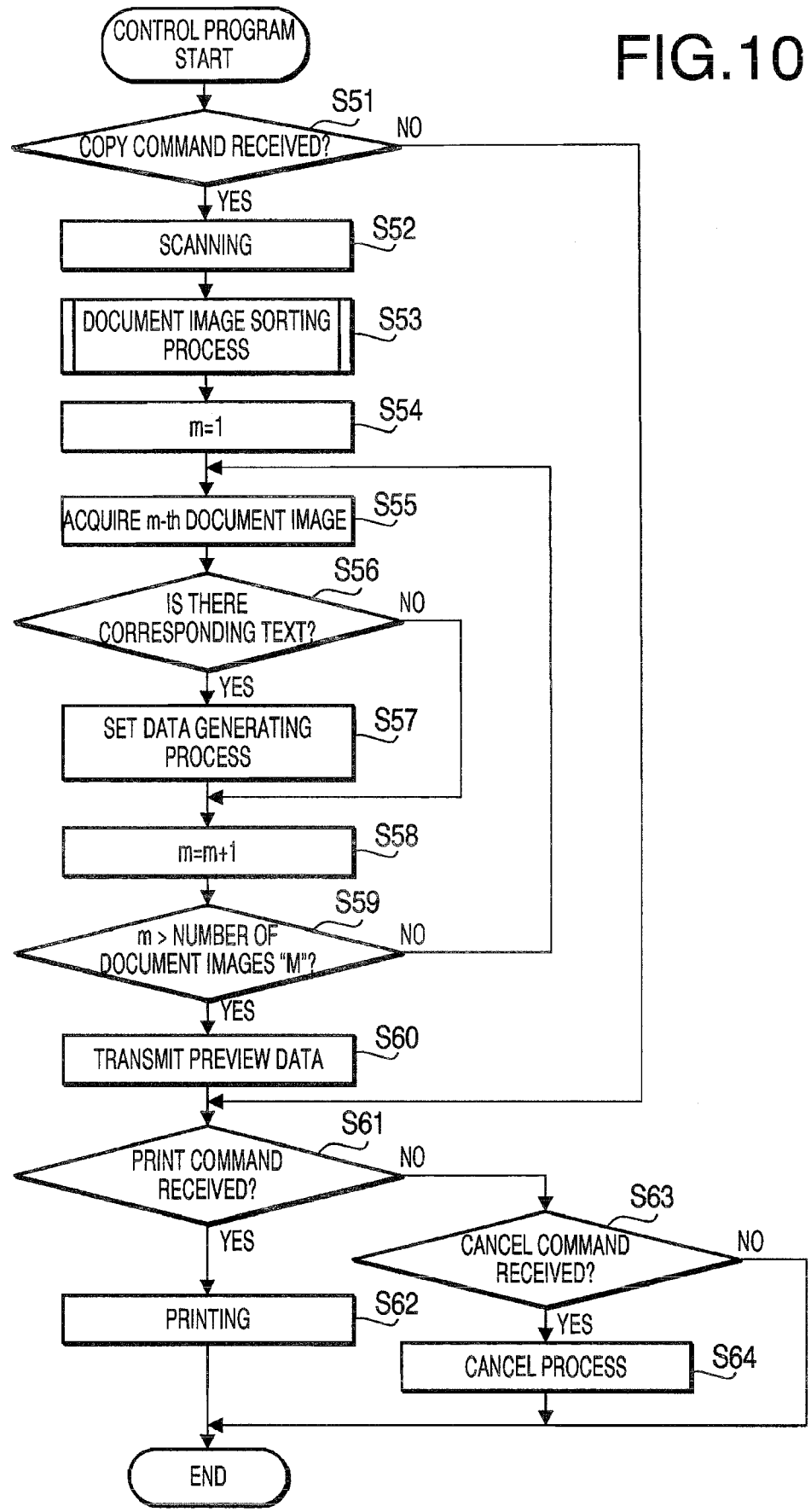
FIG. 10 is a flowchart showing a procedure of a control program to be executed by a multi-function peripheral (MFP) according to one or more aspects of the present invention.

Next, a detailed explanation will be provided about a control program of the MFP 30 included in the printing system 1, referring to FIG. 10. The control program of the MFP 30 is executed by the controller 31.

In the control program, the controller 31 first determines whether the copy command (containing the text data), transmitted by the computer 10 in the aforementioned step S8, has been received (S51). When determining that the copy command has been received (S51: Yes), the controller 31 goes to S52. Meanwhile, when determining that the copy command has not been received (S51: No), the controller 31 goes to S61.

In S52, the controller 31 performs auto-crop scanning based on the copy command received (S52).

To describe more specifically, in S52, the controller 31 controls the scanning unit 35 to generate scanned data 90 that contains document images 91 based on document sheets set on the flatbed (see FIG. 13). The scanned data 90 has a size defined with a scanned-image height H and a scanned-image width W. The scanned data 90, which constitutes the preview data, is stored on the RAM 34.

Thereafter, the controller 31 detects, from the scanned data 90 as generated, the document images 91 based on the document sheets by performing edge detection. Then, the controller 31 extracts the document images 91 and stores each of the extracted document images 71 separately onto the RAM 34. At this time, the controller 31 sequentially provides the document images 91 with respective detection number in the order in which the document images 71 have been extracted from the scanned data 70. It is noted that the detection numbers are based on a concept different from that of below-mentioned identification numbers.

Then, the controller 31 sets an orthogonal coordinate system on the scanned data 90 and acquires positional coordinate information of each of the document images 91. Specifically, the controller 31 sets a position of a pixel at a left upper end of the scanned data 90 as an origin O (see FIG. 13). Further, the controller 31 sets a line extending in a width direction of the scanned data 90 via the origin O as a horizontal axis (an X-axis) and a line extending in a height direction of the scanned data 90 via the origin O as a vertical axis (a Y-axis) (see FIG. 13).

After that, the controller 31 identifies a left upper point of each of the document images 71 as an image reference point I. Then, the controller 31 acquires positional coordinate information that represents a position of the image reference point I with respect to the orthogonal coordinate system. The controller 31 terminates the auto-crop scanning after completing acquisition of the positional coordinate information of each of the document images 91.

In S53, the controller 31 runs a document image sorting program to perform a document image sorting process (S53).

The document image sorting program will be described in detail with reference to FIG. 11. In the document image sorting process (S53), the controller 31 first sets a Y-coordinate h of target coordinates to (S71). The target coordinates denote coordinates at which the controller 31 attempts to detect existence of a document image 91.

In S72, the controller 31 sets an X-coordinate w of the target coordinates to "1" (S72).

In S73, the controller 31 runs a document image detecting program to perform a document image detecting process (S73).

The document image detecting program will be described in detail with reference to FIG. 12. In the document image detecting process (S73), the controller 31 first sets the value of a counter i to "1" (S81). The value of the counter i is associated with the detection number of each of the document images 91 so as to indicate a document image 91 to be examined in the subsequent step S82.

In S82, the controller 31 determines whether the target coordinates are identical to coordinates of a target image, based on the positional coordinate information of the target image (S82). When determining that the target coordinates are identical to the coordinates of the target image (S82: Yes), the controller 31 goes to S85. Meanwhile, when determining that the target coordinates are not identical to the coordinates of the target image (S82: No), the controller 31 goes to S83. It is noted that the target image denotes a document image 91 identified with the value of the counter i.

In S83, the controller 31 increments the value of the counter i by one (S83). Namely, the controller 31 sets a document image 91 of a next detection number as a target image.

In S84, the controller 31 determines whether the value of the counter i is more than the number of document images M (S84). The number of document images M, which is a total number of the document images 91 contained in the scanned data 90, is acquired in S52 as the maximum one of the detection numbers. When determining that the value of the counter i is more than the number of document images M (S84: Yes), the controller 31 terminates the document image detecting program and then goes to S74. Meanwhile, when determining that the value of the counter i is not more than the number of document images M (S84: No), the controller 31 goes back to S82 to perform the document image detection for a new target image.

In S85, in response to the target coordinates being identical to the coordinates of the target image (S82: Yes), the controller 31 stores image detection information onto the RAM 34 (S85).

Again referring back to FIG. 11, an explanation will be provided about S74 and the steps thereafter in the document image sorting program. In S74, the controller 31 determines whether there is a document image 91 detected at the target coordinates, based on existence/nonexistence of the aforementioned image detection information (S74). When determining that there is a document image 91 detected at the target coordinates (S74: Yes), the controller 31 goes to S75. Meanwhile, when determining that there is not a document image 91 detected at the target coordinates (S74: No), the controller 31 goes to S76.

In S75, the controller 31 provides the detected document image 91 with an identification number (S75). Specifically, the controller 31 provides each detected document image 91, sequentially in the detected order, with an identification number beginning with "1."

In S76, the controller 31 increments the X-coordinate w of the target coordinates by one so as to shift the target coordinates by one in the X-axis direction (S76).

In S77, the controller 31 determines whether the X-coordinate of the target coordinates is more than the scanned-image width W (i.e., the maximum value of the X-coordinate) (S77). Namely, the controller 31 determines whether the document image detection is performed for all pixels of a single horizontal line. When determining that the X-coordinate of the target coordinates is more than the scanned-image width W (S77: Yes), the controller 31 goes to S78. Meanwhile, when determining that the X-coordinate of the target coordinates is not more than the scanned-image width W (S77: No), the controller 31 goes back to S73.

In S78, the controller 31 increments the Y-coordinate h of the target coordinates by one so as to shift the target coordinates by one in the Y-axis direction (S78).

In S79, the controller 31 determines whether the Y-coordinate h of the target coordinates is more than the scanned-image height H (i.e., the maximum value of the Y-coordinate) (S79). Namely, the controller 31 determines whether the document image detection is performed for all pixels of the scanned data 90. When determining that the Y-coordinate h of the target coordinates is more than the scanned-image height H (S79: Yes), the controller 31 terminates the document image sorting program. Then, the controller 31 goes to S54. Meanwhile, when determining that the Y-coordinate h of the target coordinates is not more than the scanned-image height H (S79: No), the controller 31 goes back to S72.

Again referring back to FIG. 10, an explanation will be provided about S54 and the steps thereafter in the control program of the MFP 30. In S54, the controller 31 sets the value of the counter m to "1" (S54). In this case, the value of the counter m is associated with the identification number for identifying each ancillary text and each document image 91.

In S55, the controller 31 acquires, from the RAM 34, a document image 91 provided with an identification number identical to the value of the counter m, and sets the acquired document image 91 as a set target image (S55). The set target image denotes a document image 91 to be processed in a below-mentioned set data generating process (S57).

In S56, the controller 31 determines whether there is a corresponding text in the text data received along with the copy command (S56). The corresponding text denotes text data provided with the identification number identical to the value of the counter m. When determining that there is a corresponding text in the text data received along with the copy command (S56: Yes), the controller 31 goes to S57. Meanwhile, when determining that there is not a corresponding text in the text data received along with the copy command (S56: No), the controller 31 goes to S58.

In S57, the controller 31 performs a set data generating process (S57). In the set data generating process (S57), the controller 31 generates set data on which a document image 91 and an ancillary text image 95 of a corresponding text are combined to be allocated in respective predetermined positions.

In S58, the controller 31 increments the value of the counter m by one to change a document image 91 and a text to be processed (S58).

In S59, the controller 31 determines whether the value of the counter m is more than the number of document images M, namely whether the set data generating process has completely been performed for all of the document images 91 (S59). When determining that the value of the counter m is more than the number of document images M (S59: Yes), the controller 31 goes to S60. Meanwhile, when determining that the value of the counter m is more than the number of document images M (S59: No), the controller 31 goes back to S55.

In S60, the controller 31 reads, out of the RAM 34, the scanned data 90 and the set data generated in S57, and transmits the read data (i.e., the scanned data 90 and the set data) as the preview data via the network I/F 40 (S60).

In S61, the controller 31 determines whether the print command has been received from the computer 10 via the network I/F 40 (S61). When determining that the print command has been received from the computer 10 (S61: Yes), the controller 31 goes to S61. Meanwhile, when determining that the print command has not been received from the computer 10 (S61: No), the controller 31 goes to S63.

In S62, the controller 31 performs a printing operation on one or more sheets based on the set data (see FIG. 14) (S62). After completing the printing operation, the controller 31 terminates the control program.

In S63, the controller 31 determines whether the cancel command has been received from the computer 10 via the network I/F 40 (S63). When determining that the cancel command has been received from the computer 10 (S63: Yes), the controller 31 goes to S64. Meanwhile, when determining that the cancel command has not been received from the computer 10 (S63: No), the controller 31 terminates the control program.

In S64, the controller 31 performs a cancel process, in which the controller 31 deletes the set data from the RAM 34 (S64). Thereafter, the controller 31 terminates the control program.

Figure 11:
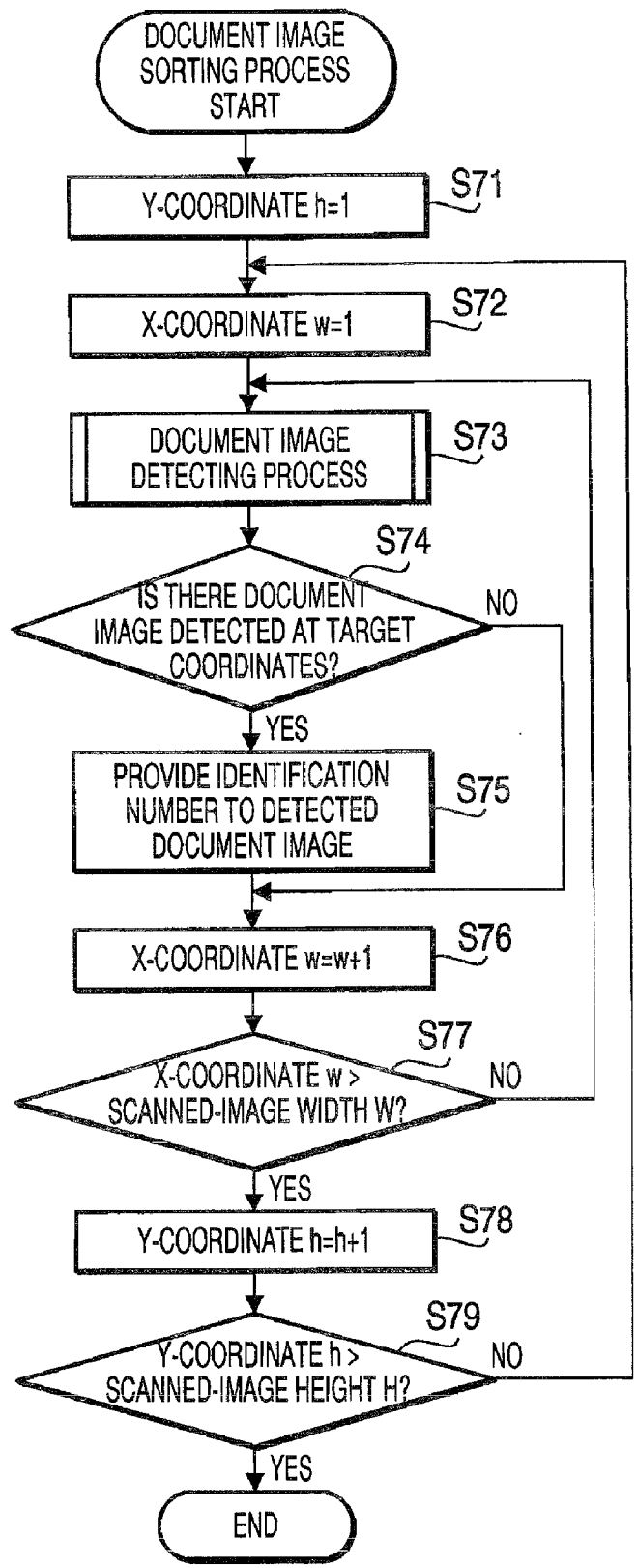
FIG. 11 is a flowchart showing a procedure of a document image sorting program according to one or more aspects of the present invention.
Figure 12:
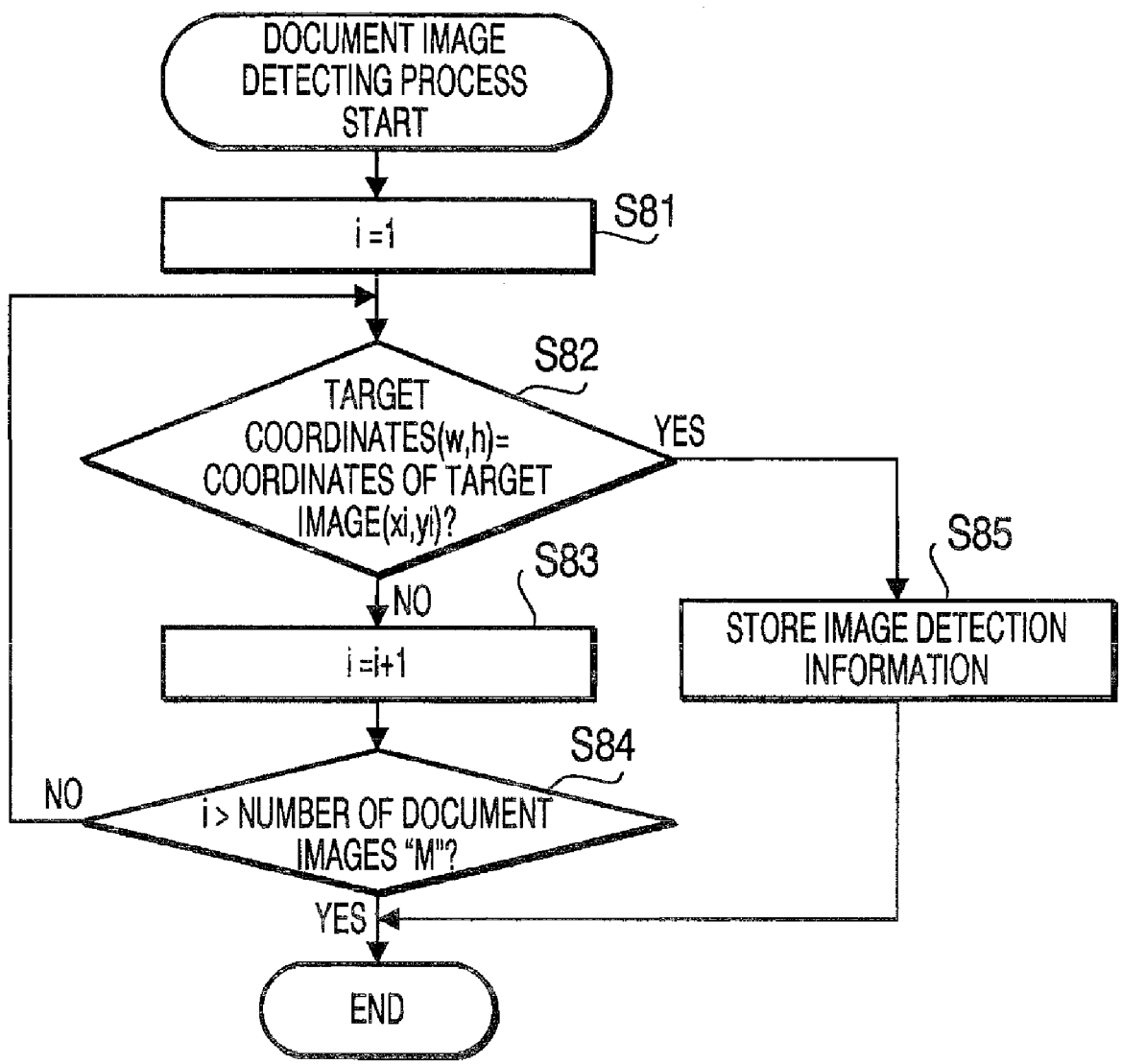
FIG. 12 is a flowchart showing a procedure of a document image detecting program according to one or more aspects of the present invention.

As described above, the printing system 1 of the first embodiment (i.e., the main control program, of the computer 10, shown in FIGS. 2, 4, 6, and 8, and the control program, of the MFP 30, shown in FIGS. 10 to 12) extracts, from the scanned data 90 that contains a plurality of document images 91, each of the document images 91 (S52). Further, according to the printing system 1, the user can input a desired text in a text entry field 54A, 54B, or 54C (S1). The printing system 1 associates each of the document images 91 with a corresponding one of the input texts based on the identification numbers of the document images and the texts, and generates the set data (S55 to S59). Each piece of the set data generally contains a set of a document image 91 and an ancillary text image 95. Each piece of the set data generated is printed on a sheet on a page-by-page basis (S62 and FIG. 14).

Consequently, by performing a single scanning operation, the printing system 1 can present a printed output each page of which has an ancillary text image 95 added to a corresponding one of a plurality of document images 91. Thus, the printing system 1 can reduce a burden placed on the user and provide a high level of user-friendliness, since the user needs not perform scanning of document sheets on a sheet-by-sheet basis.

When the number of the document images 91 is equal to the number of the ancillary texts input (S11: Yes), the printing system 1 can provide sheets printed in a user-desired manner at a time. Therefore, the printing system 1 can more effectively reduce a burden placed on the user and provide a higher level of user-friendliness. In the example shown in FIG. 14, the user can obtain a first printed sheet 100A, a second printed sheet 100B, and a third printed sheet 100C in a user-desired manner through a single scanning operation.

Further, even though the number of the document images is not equal to the number of the ancillary texts (S11: No), the printing system 1 can, at a time, print set data each piece of which has a set of a document image and an ancillary text. Moreover, with respect to data that lacks a document image, the printing system 1 performs the correspondence set data process (S17) and the before-rescanning preview process (S18) to fill up the deficiency (add a desired document image). Namely, the printing system 1 can re-acquire a document image and finally provide all sheets printed in a user-desired manner. At this time, the printing system 1 automatically sets an ancillary text of the set data that lacks a document image as a text to be processed in S17 and S18. Thus, the printing system 1 can certainly reduce a burden placed on the user who attempts to obtain a desired printed output.

For example, when the user desires the first to third printed sheets 100A, 100B, and 100C as shown in FIG. 14, and has not acquired the document image 91 to be formed on the third printed sheet 100C, the printing system 1 displays the set data display screen 70 (see the third preview image 72C in FIG. 7). In this situation, the user can quickly acquire the first printed sheet 100A and the second printed sheet 100B.

In the above situation, the printing system 1 automatically inputs an ancillary text "It was a delightful trip" into the first text entry field 84A on the before-rescanning preview screen 80. Then, when the user sets a desired document sheet to supplement a desired document image, the printing system 1 can additionally provide the third printed sheet 100C without making the user perform a troublesome operation of inputting the text. Thus, even in such a situation, the printing system 1 can finally provide the first to third printed sheets 100A to 100C that the user desires in a user-friendly manner.

Further, in the auto-crop scanning (S52), all of the document images 91 are not necessarily extracted from the scanned data 90 in a certain manner. For example, owing to some conditions such as a stain on an image, an extraction error may be caused in which an image on a document sheet may not be extracted at all or may be identified as two images. Even in such a situation, the printing system 1 can provide a user-desired printed output in an easy and user-friendly manner.

Further, the printing system 1 performs a printing operation based on the set data determined as data to be printed on the set data display screen 70. Therefore, the printing system 1 can certainly provide a user-desired printed output. Additionally, the printing system 1 sets, as a reconfigured text, an ancillary text of the set data excluded from data to be printed in this case. Hence, when a desired document image is acquired, the printing system 1 can provide a user-desired printed output.

Further, the printing system 1 provides information on set positions of the reconfigured text and a document sheet to be rescanned on the before-rescanning preview screen 80. When the document sheet is set based on the information, the printing system 1 can present a user-desired printed output in a certain and user-friendly manner. Thus, the printing system 1 can reduce a burden placed on the user who attempts to obtain the desired printed output.

Second Embodiment

Subsequently, an explanation will be provided about a second embodiment, in which one or more aspects of the present invention are applied to an MFP 30. A basic configuration of the MFP 30 in the second embodiment is the same as that of the MFP 30 in the first embodiment. Therefore, differences between the first and second embodiments will be set forth below.

In the second embodiment, the main control program shown in FIGS. 2, 4, 6, and 8 is stored on a storage unit (e.g., the ROM 33) of the MFP 30, and executed by the controller 31 of the MFP 30.

Figure 2:
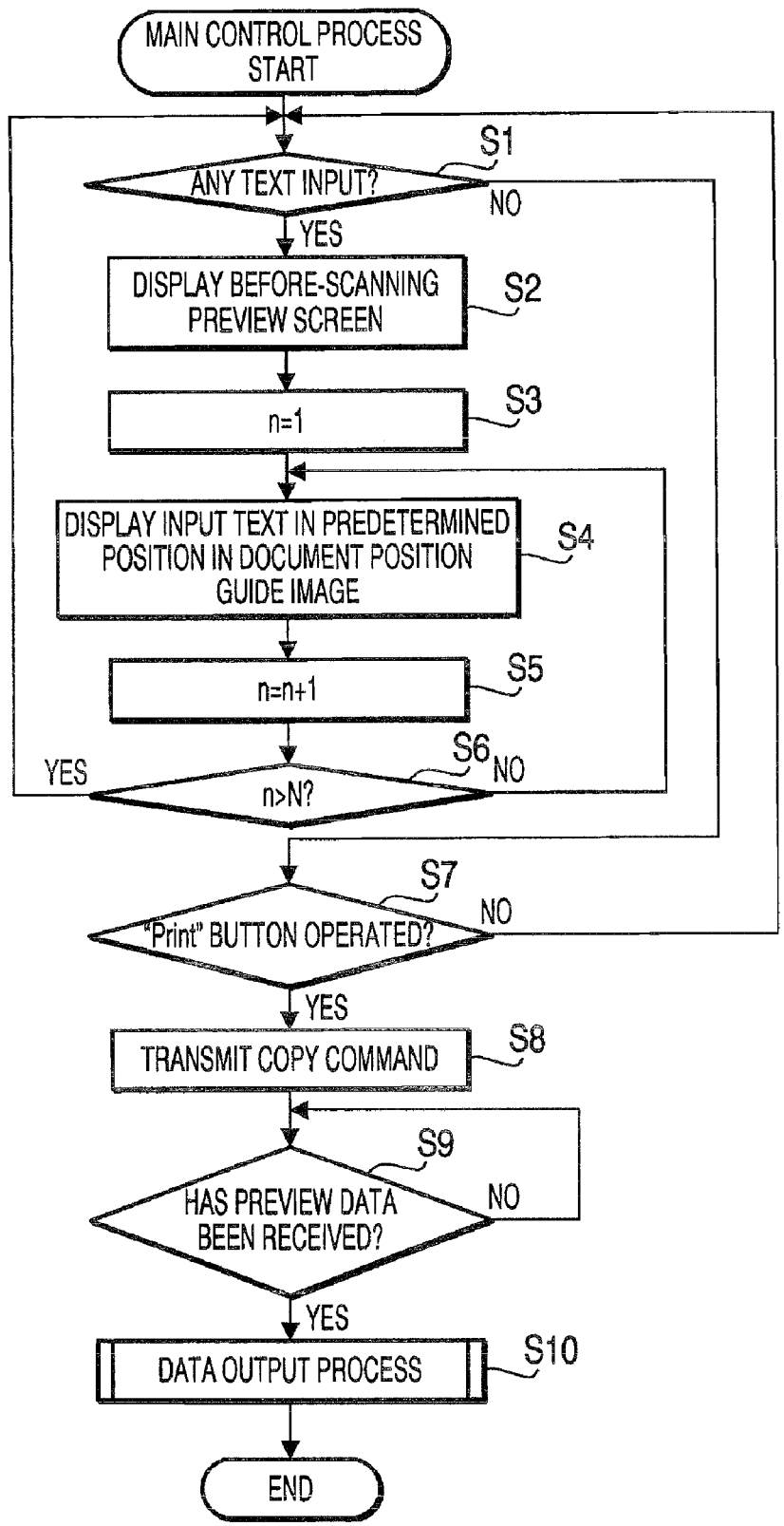
Figure 6:
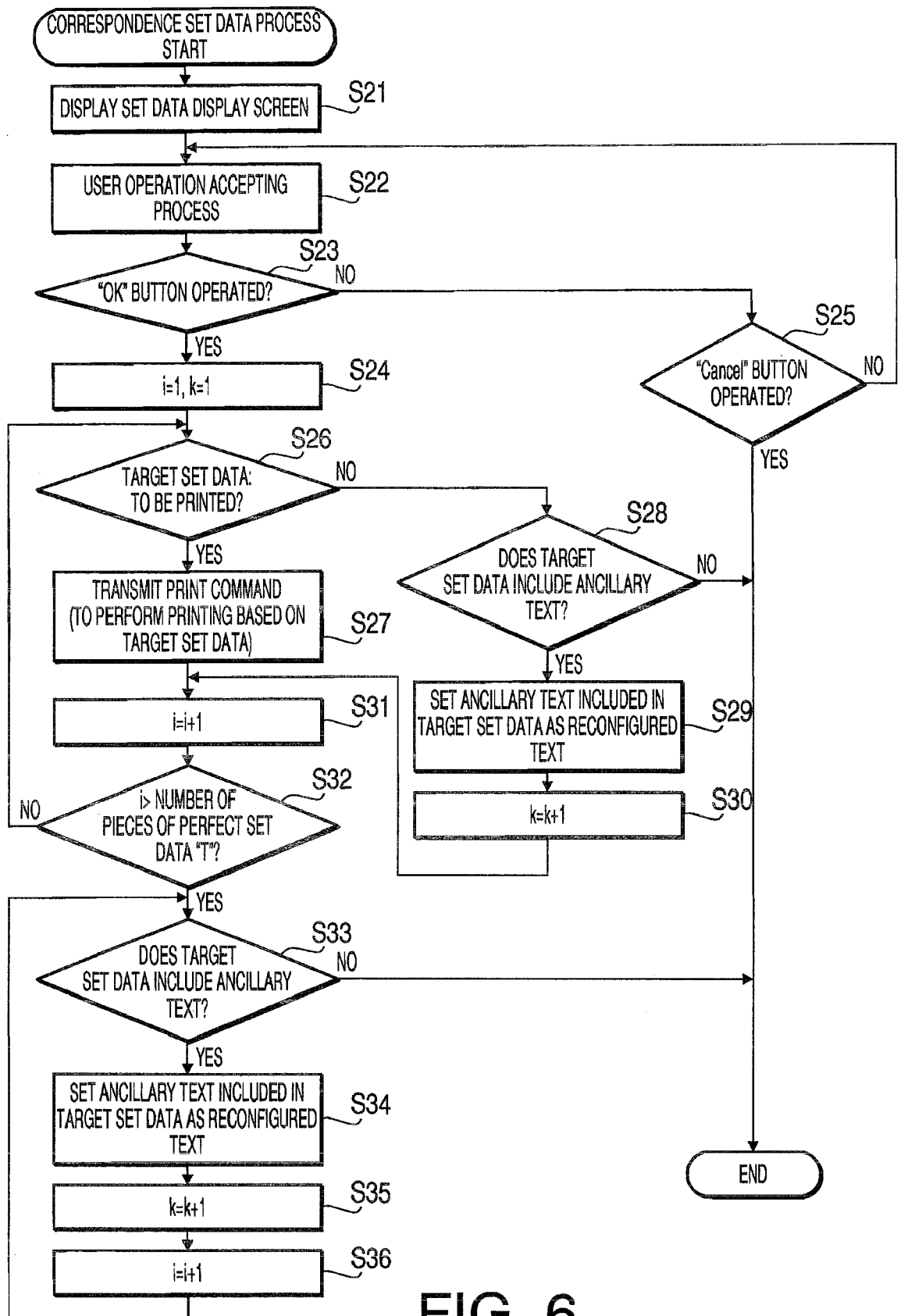

Further, the second embodiment is different from the first embodiment in operations of the steps S2, S4, S8, and S9 in FIG. 2, S12, S14, and S16 in FIG. 4, S21 and S27 in FIG. 6, and S42, S44, S48, and S49 in FIG. 8. The operations of the other steps in the second embodiment are the same as those in the first embodiment. Next, the differences between the first and the second embodiments will be described.

In the second embodiment, the before-scanning preview screen 50 in S2 and S4, the print preview screen 60 in S12, the set data display screen 70 in S21, and the before-rescanning preview screen 80 in S42 and S44 are displayed on not the display unit 25 but the display panel 38. Except for the difference as to whether the above screens 50, 60, 70, and 80 are displayed on the display unit 25 or the display panel 38, the other operations of S2, S4, S12, S21, S42, and S44 in the second embodiment are the same as those in the first embodiment.

In the second embodiment, the operations of S8, S9, S14, S16, S27, S48, and S49 are executed within the MFP 30 without any communication with an external device such as the computer 10 in the first embodiment. Except for the aspect that no communication is performed with any external device the other operations of S8, S9, S14, S16, S27, S48, and S49 in the second embodiment are the same as those in the first embodiment.

According to the above configuration, the MFP 30, the main control program, and the control program in the second embodiment can provide the same effects as the printing system 1, the main control program, and the control program in the first embodiment. Specifically, even though the number of the document images 91 is not equal to the number of the ancillary texts, the MFP 30, the main control program, and the control program in the second embodiment can present a high level of user-friendliness so as to reduce a burden placed on the user who attempts to perform a printing operation based on the set data each piece of which has a set of a document image 91 and an ancillary text image.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiments, set data is generated in each piece of which an ancillary text image 95 based on a text input by the user is associated with a document image 91. However, various kinds of data may be applied as data to be associated with a document image 91. For instance, a facsimile number may be associated with a facsimile document. In this case, facsimile transmission may be performed as an operation based on the set data.

Further, in the aforementioned embodiments, a printed output is obtained based on set data that is generated with a set of an ancillary text and a document image 91 reacquired.

However, an output may be obtained based on set data that is generated with a set of a document image 91 and a text re-input.

What is claimed is:

1. An image processing device comprising:
    an image acquiring unit configured to acquire image data from one or more document sheets set thereon;
    an image extracting unit configured to extract, from the acquired image data, respective document images based on the document sheets;
    an image position specifying unit configured to specify a position of each of the extracted document images which position is defined on the acquired image data;
    a first identification provider configured to provide each of the document images with a first identification for identifying the document image, based on the specified positions of the document images;
    an input unit configured to input ancillary data each piece of which is for creating an ancillary image;
    a second identification provider configured to provide each piece of the input ancillary data with a second identification for identifying the piece of the ancillary data;
    an ancillary data identifying unit configured to identify a piece of the ancillary data as being associated with each of the document images, based on the first and second identifications;
    a set data generator configured to generate set data each piece of which has a set of a document image and an ancillary image based on ancillary data identified by the ancillary data identifying unit as being associated with the document image;
    a determining unit configured to determine whether a total number of the ancillary images based on the input data is equal to a total number of the document images extracted;
    an adjuster configured to, when the determining unit determines that the total number of the ancillary images is different from the total number of the document images, make an adjustment such that the total number of the ancillary images is equal to the total number of the document images;
    a data generation controller configured to take control of the set data generator to generate the set data based on the document images and the ancillary images after the adjustment by the adjuster; and
    an output unit configured to output the set data generated by the set data generator under the control by the data generation controller.

2. The image processing device according to claim 1, wherein the adjuster comprises a data adding unit configured to, when the determining unit determines that the total number of the ancillary images is different from the total number of the document images, add image data so as to fill up a deficiency in one of the ancillary images and the document images.

3. The image processing device according to claim 1, further comprising:
    a target data setting unit configured to set a target piece of the generated set data to be output by the output unit; and
    an output controller configured to control the output unit to output the target piece of the set data that is set by the target data setting unit.

4. The image processing device according to claim 1, further comprising a display unit configured to, when the determining unit determines that the total number of the ancillary images is different from the total number of the document images, display an adjustment screen on which the adjuster makes the adjustment such that the total number of the ancillary images is equal to the total number of the document images.

5. The image processing device according to claim 4, wherein the adjuster comprises a data adding unit configured to, when the determining unit determines that the total number of the ancillary images is different from the total number of the document images, add image data so as to fill up a deficiency in one of the ancillary images and the document images, on the adjustment screen that the display unit displays.

6. The image processing device according to claim 5, further comprising:
   a first display controller configured to, when the determining unit determines that the total number of the ancillary images is more than the total number of the document images, control the display unit to display, on the adjustment screen:
      a first ancillary image corresponding to ancillary data that the ancillary data identifying unit fails to identify as being associated with any of the document images; and
      a set position image representing a set position, on the image acquiring unit, of a document sheet having thereon a document image to be additionally acquired in association with the first ancillary image; and
   a first reconfiguring unit configured to reconfigure the ancillary data corresponding to the first ancillary image, to be identified by the ancillary data identifying unit.

7. The image processing device according to claim 3, further comprising a display unit configured to, when the determining unit determines that the total number of the ancillary images is different from the total number of the document images, display an adjustment screen on which the adjuster makes the adjustment such that the total number of the ancillary images is equal to the total number of the document images.

8. The image processing device according to claim 7, wherein the adjuster comprises a data adding unit configured to, when the determining unit determines that the total number of the ancillary images is different from the total number of the document images, add image data so as to fill up a deficiency in one of the ancillary images and the document images, on the adjustment screen that the display unit displays.

9. The image processing device according to claim 8, further comprising:
   a second display controller configured to, when the determining unit determines that the total number of the ancillary images is more than the total number of the document images, control the display unit to display, on the adjustment screen:
      a second ancillary image corresponding to ancillary data that the target data setting unit does not set to be output by the output unit; and
      a set position image representing a set position, on the image acquiring unit, of a document sheet having thereon a document image to be additionally acquired in association with the second ancillary image; and
   a second reconfiguring unit configured to reconfigure the ancillary data corresponding to the second ancillary image to be identified by the ancillary data identifying unit.

10. An image processing system comprising:
   an image acquiring unit configured to acquire image data from one or more document sheets set thereon;
   an image extracting unit configured to extract, from the acquired image data, respective document images based on the document sheets;
   an image position specifying unit configured to specify a position of each of the extracted document images which position is defined on the acquired image data;
   a first identification provider configured to provide each of the document images with a first identification for identifying the document image, based on the specified positions of the document images;
   an input unit configured to input ancillary data each piece of which is for creating an ancillary image;
   a second identification provider configured to provide each piece of the input ancillary data with a second identification for identifying the piece of the ancillary data;
   an ancillary data identifying unit configured to identify a piece of the ancillary data as being associated with each of the document images, based on the first and second identifications;
   a set data generator configured to generate set data each piece of which has a set of a document image and an ancillary image based on ancillary data identified by the ancillary data identifying unit as being associated with the document image;
   a determining unit configured to determine whether a total number of the ancillary images based on the input data is equal to a total number of the document images extracted;
   an adjuster configured to, when the determining unit determines that the total number of the ancillary images is different from the total number of the document images, make an adjustment such that the total number of the ancillary images is equal to the total number of the document images;
   a data generation controller configured to take control of the set data generator to generate the set data based on the document images and the ancillary images after the adjustment by the adjuster; and
   an output unit configured to output the set data generated by the set data generator under the control by the data generation controller.

11. A non-transitory computer readable medium having computer readable instructions stored thereon, the instructions, when executed by a processor, causing the processor to perform:
   an image acquiring step of acquiring image data from one or more document sheets set on an image acquiring unit;
   an image extracting step of extracting, from the acquired image data, respective document images based on the document sheets;
   an image position specifying step of specifying a position of each of the extracted document images which position is defined on the acquired image data;
   a first identification providing step of providing each of the document images with a first identification for identifying the document image, based on the specified positions of the document images;
   an input step of inputting ancillary data each piece of which is for creating an ancillary image;
   a second identification providing step of providing each piece of the input ancillary data with a second identification for identifying the piece of the ancillary data;
   an ancillary data identifying step of identifying a piece of the ancillary data as being associated with each of the document images, based on the first and second identifications;
   a determining step of determining whether a total number of the ancillary images based on the input data is equal to a total number of the document images extracted;
   an adjusting step of, when it is determined in the determining step that the total number of the ancillary images is different from the total number of the document images, making an adjustment such that the total number of the ancillary images is equal to the total number of the document images;

a set data generating step of, based on the document images and the ancillary images after the adjustment in the adjusting step, generating set data each piece of which has a set of a document image and an ancillary image based on ancillary data identified in the ancillary data identifying step as being associated with the document image; and an output step of outputting the set data generated in the set data generating step.

12. The non-transitory computer readable medium according to claim 11, wherein the adjusting step comprises a data adding step of, when it is determined in the determining step that the total number of the ancillary images is different from the total number of the document images, adding image data so as to fill up a deficiency in one of the ancillary images and the document images.

13. The non-transitory computer readable medium according to claim 11, wherein the instructions cause the processor to further perform a target data setting step of setting a target piece of the generated set data to be output, wherein the output step comprises a step of outputting the target piece of the set data that is set in the target data setting step.

14. The non-transitory computer readable medium according to claim 11, wherein the instructions cause the processor to further perform a display step of, when it is determined in the determining step that the total number of the ancillary images is different from the total number of the document images, displaying an adjustment screen on which the adjustment is made in the adjusting step such that the total number of the ancillary images is equal to the total number of the document images.

15. The non-transitory computer readable medium according to claim 14, wherein the adjusting step comprises a data adding step of, when it is determined in the determining step that the total number of the ancillary images is different from the total number of the document images, adding image data so as to fill up a deficiency in one of the ancillary images and the document images, on the adjustment screen displayed in the display step.

16. The non-transitory computer readable medium according to claim 15, wherein the display step comprises a step of, when it is determined in the determining step that the total number of the ancillary images is more than the total number of the document images, displaying, on the adjustment screen:

a first ancillary image corresponding to ancillary data that fails to be identified in the ancillary data identifying step as being associated with any of the document images; and a set position image representing a set position, on the image acquiring unit, of a document sheet having thereon a document image to be additionally acquired in association with the first ancillary image, and wherein the instructions cause the processor to further perform a first reconfiguring step of reconfiguring the ancillary data corresponding to the first ancillary image, to be identified in the ancillary data identifying step.

17. The non-transitory computer readable medium according to claim 13, wherein the instructions cause the processor to further perform a display step, when it is determined in the determining step that the total number of the ancillary images is different from the total number of the document images, displaying an adjustment screen on which the adjustment is made in the adjusting step such that the total number of the ancillary images is equal to the total number of the document images.

18. The non-transitory computer readable medium according to claim 17, wherein the adjusting step comprises a data adding step of, when it is determined in the determining step that the total number of the ancillary images is different from the total number of the document images, adding image data so as to fill up a deficiency in one of the ancillary images and the document images, on the adjustment screen displayed in the display step.

19. The non-transitory computer readable medium according to claim 18, wherein the display step comprises a step of, when it is determined in the determining step that the total number of the ancillary images is more than the total number of the document images, displaying, on the adjustment screen:

a second ancillary image corresponding to ancillary data that is not set, in the target data setting step, to be output in the output step; and a set position image representing a set position, on the image acquiring unit, of a document sheet having thereon a document image to be additionally acquired in association with the second ancillary image, and wherein the instructions cause the processor to further perform a second reconfiguring step of reconfiguring the ancillary data corresponding to the second ancillary image, to be identified in the ancillary data identifying step.

* * * * *